(12) United States Patent
Huang et al.

(10) Patent No.: US 12,007,794 B2
(45) Date of Patent: Jun. 11, 2024

(54) METHOD AND APPARATUS FOR TRACKING MOVING TARGET AND UNMANNED AERIAL VEHICLE

(71) Applicant: AUTEL ROBOTICS CO., LTD., Guangdong (CN)

(72) Inventors: Xin Huang, Guangdong (CN); Yuanyuan Du, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 263 days.

(21) Appl. No.: 17/643,696

(22) Filed: Dec. 10, 2021

(65) Prior Publication Data
US 2022/0137648 A1 May 5, 2022

Related U.S. Application Data

(63) Continuation of application No. PCT/CN2020/095841, filed on Jun. 12, 2020.

(51) Int. Cl.
*G05D 1/12* (2006.01)
*B64C 39/02* (2023.01)
(Continued)

(52) U.S. Cl.
CPC ............ *G05D 1/12* (2013.01); *B64C 39/024* (2013.01); *B64D 47/08* (2013.01); *G05D 1/0038* (2013.01);
(Continued)

(58) Field of Classification Search
CPC ...... G05D 1/12; G05D 1/0038; G05D 1/0094; G05D 1/101; B64C 39/024; B64D 47/08;
(Continued)

(56) References Cited

U.S. PATENT DOCUMENTS 9,930,298 B2 3/2018 Bevirt
2017/0134631 A1* 5/2017 Zhao .................. G06V 20/10
(Continued)

FOREIGN PATENT DOCUMENTS

CN 103149939 A 6/2013
CN 107209854 A 9/2017
(Continued)

OTHER PUBLICATIONS

PCT International Search Report.

*Primary Examiner* — Muhammad Shafi
(74) *Attorney, Agent, or Firm* — Frank Gao, Esq.

(57) ABSTRACT

Embodiments of the disclosure disclose a method and an apparatus for tracking a moving target and an unmanned aerial vehicle. The method includes: identifying and locking a moving target; and adjusting a moving state of the unmanned aerial vehicle and/or parameters of the photographing device according to a moving state of the moving target, so that the moving target is always located on a display screen of a control terminal. A method and an apparatus for tracking a moving target and an unmanned aerial vehicle provided in the disclosure can adjust the moving state of the unmanned aerial vehicle and/or the parameters of the photographing device in real time according to the moving state of the moving target and can ensure that the moving target in a preset size is always located on the display screen of the control terminal.

20 Claims, 4 Drawing Sheets

(51) Int. Cl.
*B64D 47/08* (2006.01)
*G05D 1/00* (2006.01)
*G06T 7/246* (2017.01)
*G06T 7/73* (2017.01)
*G06V 20/17* (2022.01)
*H04N 23/67* (2023.01)
*H04N 23/695* (2023.01)
*B64U 101/30* (2023.01)

(52) U.S. Cl.
CPC ........... *G05D 1/0094* (2013.01); *G06T 7/251* (2017.01); *G06T 7/75* (2017.01); *G06V 20/17* (2022.01); *H04N 23/675* (2023.01); *H04N 23/695* (2023.01); *B64U 2101/30* (2023.01); *B64U 2201/10* (2023.01); *G06T 2207/10032* (2013.01); *G06V 2201/07* (2022.01)

(58) Field of Classification Search
CPC . G06T 7/251; G06T 7/75; G06T 2207/10032; G06T 7/246; G06V 20/17; G06V 2201/07; H04N 23/675; H04N 23/695; H04N 23/60; B64U 2101/30; B64U 2201/10

USPC .......................................................... 701/3
See application file for complete search history.

(56) References Cited

U.S. PATENT DOCUMENTS

| | | |
|---|---|---|
| 2018/0158197 A1 | 6/2018 | Dasgupta et al. |
| 2018/0203467 A1* | 7/2018 | Zhou ..................... G06T 7/248 |
| 2019/0011921 A1* | 1/2019 | Wang ..................... G05D 1/106 |
| 2019/0082088 A1* | 3/2019 | Zhao ...................... G06V 20/13 |
| 2021/0116943 A1* | 4/2021 | Wang ..................... G06V 20/13 |
| 2021/0223795 A1* | 7/2021 | Zhao ...................... G05D 1/12 |

FOREIGN PATENT DOCUMENTS

| | | |
|---|---|---|
| CN | 108476288 A | 8/2018 |
| CN | 109814588 A | 5/2019 |
| CN | 110147122 A | 8/2019 |

* cited by examiner

METHOD AND APPARATUS FOR TRACKING MOVING TARGET AND UNMANNED AERIAL VEHICLE

The present application is a continuation of International Application No. PCT/CN2020/095841, filed on Jun. 12, 2020, which claims priority to Chinese Patent Application No. 201910516768.7, filed on Jun. 14, 2019, which is incorporated herein by reference in its entirety.

TECHNICAL FIELD

The present application relates to the field of unmanned aerial vehicle tracking technologies and in particular, to a method and an apparatus for tracking a moving target and an unmanned aerial vehicle.

BACKGROUND

Currently, unmanned aerial vehicles are widely used for tracking moving targets. Generally, wireless ranging sensors are mounted at different positions on a surface of a moving target and the wireless ranging sensors form a local positioning network fixed on the surface of the moving target. After being mounted on an unmanned aerial vehicle, a wireless ranging sensor performs communication and ranging with the wireless ranging sensors on the moving target. The unmanned aerial vehicle moves in the local positioning network and a position of the unmanned aerial vehicle in a local positioning system is calculated according to a ranging value, thereby locking the position and tracking the moving target.

However, the above-mentioned method for tracking a moving target needs to rely on external sensors and further rely on a communication module on a moving target to perform data communication and transmission, causing problems of poor stability and a narrow range of application when an unmanned aerial vehicle is tracking the moving target.

SUMMARY

The technical problem to be solved by the disclosure is to provide a method and an apparatus for tracking a moving target and an unmanned aerial vehicle, thereby solving technical problems of poor stability and a narrow range of application when tracking a moving target in the related technologies.

According to an aspect of the embodiments of the disclosure, a method for tracking a moving target is provided, applicable to an unmanned aerial vehicle,
where the unmanned aerial vehicle includes a photographing device, the photographing device includes a gimbal and a camera mounted on the gimbal and the method includes:
identifying and locking a moving target; and
adjusting a moving state of the unmanned aerial vehicle and/or parameters of the photographing device according to a moving state of the moving target, so that the moving target is always located on a display screen of a control terminal, where the control terminal is communicably connected to the unmanned aerial vehicle.

Optionally, the identifying and locking a moving target includes:
identifying and locking the moving target through machine vision.

Optionally, the identifying and locking a moving target includes:
acquiring a plurality of images of the moving target through the photographing device;
extracting features of the moving target based on the plurality of images of the moving target, where the features of the moving target include at least one of a texture feature, a shape feature, or a spatial feature;
establishing a feature classification model, where the feature classification model is configured to represent a category of the moving target; and
performing feature matching on the moving target based on the feature classification model, to identify and lock the moving target.

Optionally, the method further includes:
performing preprocessing on the plurality of images of the moving target.

Optionally, the performing preprocessing on the plurality of images of the moving target includes:
performing preprocessing on performance features of each of the plurality of images of the moving target, so that the performance features of each of the images are consistent, where the performance features include at least one of the following:
a color of the image, brightness of the image, or a size of the image.

Optionally, the moving state of the moving target includes a moving direction of the moving target, the parameters of the photographing device include an angle of the gimbal and then:
the adjusting a moving state of the unmanned aerial vehicle and/or parameters of the photographing device according to a moving state of the moving target, so that the moving target is always located on a display screen of a control terminal includes:
determining whether the moving direction of the moving target is consistent with a moving direction of the unmanned aerial vehicle; and
if not, adjusting the angle of the gimbal according to the moving direction of the moving target, so that the moving target is always located at a preset position on the display screen of the control terminal.

Optionally, when the moving direction of the moving target is inconsistent with the moving direction of the unmanned aerial vehicle, the adjusting the angle of the gimbal according to the moving direction of the moving target, so that the moving target is always located at a preset position on the display screen of the control terminal includes:
adjusting a yaw angle of the gimbal when the moving direction of the moving target is leftward and rightward relative to the camera, so that the moving target is always located at the preset position on the display screen of the control terminal.

Optionally, when the moving direction of the moving target is inconsistent with the moving direction of the unmanned aerial vehicle, the adjusting the angle of the gimbal according to the moving direction of the moving target, so that the moving target is always located at the preset position on the display screen of the control terminal includes:
adjusting a pitch angle of the gimbal when the moving direction of the moving target is forward and backward relative to the camera, so that the moving target is always located at the preset position on the display screen of the control terminal.

Optionally, the method further includes:

determining whether an image size of the moving target on the display screen of the control terminal is smaller than a preset size; and if yes, adjusting the moving state of the unmanned aerial vehicle and/or the parameters of the photographing device, so that the moving target in the preset size is always located at the preset position on the display screen of the control terminal.

Optionally, when the image size of the moving target on the display screen of the control terminal is smaller than the preset size, the adjusting the moving state of the unmanned aerial vehicle and/or the parameters of the photographing device, so that the moving target in the preset size is always located at the preset position on the display screen of the control terminal includes:

determining whether a speed change rate of the moving target in the moving direction of the unmanned aerial vehicle is greater than a first threshold; and if yes, adjusting a speed of the unmanned aerial vehicle, so that the moving target in the preset size is always located at the preset position on the display screen.

Optionally, when the image size of the moving target on the screen of the control terminal is smaller than the preset size, the adjusting the moving state of the unmanned aerial vehicle and/or the parameters of the photographing device, so that the moving target in the preset size is always located at the preset position on the display screen of the control terminal includes:

determining whether a difference between a speed of the moving target and a speed of the unmanned aerial vehicle is greater than a second threshold; and if yes, adjusting a focal length of the camera, so that the moving target in the preset size is always located at the preset position on the display screen.

Optionally, the preset position is a central position of the display screen of the control terminal.

Optionally, the method further includes:

determining whether the moving target is lost; and if yes, searching for the moving target and re-identifying and locking the moving target.

According to another aspect of the embodiments of the disclosure, an apparatus for tracking a moving target is provided, applicable to an unmanned aerial vehicle, where the unmanned aerial vehicle includes a photographing device, the photographing device includes a gimbal and a camera mounted on the gimbal and the apparatus includes:

an identification module, configured to identify and lock a moving target; and an adjustment module, configured to adjust a moving state of the unmanned aerial vehicle and/or parameters of the photographing device according to a moving state of the moving target, so that the moving target is always located on a display screen of a control terminal, where the control terminal is communicably connected to the unmanned aerial vehicle.

Optionally, the identification module identifies and locks the moving target through machine vision.

Optionally, the identification module is further configured to:

acquire images of the moving target from a plurality of angles through the photographing device to acquire a plurality of images of the moving target;

extract features of the moving target based on the plurality of images of the moving target, where the features of the moving target include at least one of a texture feature, a shape feature, or a spatial feature;

establish a feature classification model, where the feature classification model is configured to represent a category of the moving target; and perform feature matching on the moving target based on the feature classification model, to identify and lock the moving target.

Optionally, the apparatus further includes a preprocessing module, where the preprocessing module is configured to perform preprocessing on the plurality of images of the moving target.

Optionally, the preprocessing module is further configured to:

perform preprocessing on performance features of each of the plurality of images of the moving target, so that the performance features of each of the images are consistent, where the performance features include at least one of the following:

a color of the image, brightness of the image, or a size of the image.

Optionally, the moving state of the moving target includes a moving direction of the moving target, the parameters of the photographing device include an angle of the gimbal and then:

the adjustment module is further configured to:

determine whether the moving direction of the moving target is consistent with a moving direction of the unmanned aerial vehicle; and if not, adjust the angle of the gimbal according to the moving direction of the moving target, so that the moving target is always located at a preset position on the display screen of the control terminal.

Optionally, the adjustment module is further configured to:

adjust a yaw angle of the gimbal when the moving direction of the moving target is leftward and rightward relative to the camera, so that the moving target is always located at the preset position on the display screen of the control terminal.

Optionally, the adjustment module is further configured to:

adjust a pitch angle of the gimbal when the moving direction of the moving target is forward and backward relative to the camera, so that the moving target is always located at the preset position on the display screen of the control terminal.

Optionally, the adjustment module is further configured to:

determine whether an image size of the moving target on the display screen of the control terminal is smaller than a preset size; and if yes, adjust the moving state of the unmanned aerial vehicle and/or the parameters of the photographing device, so that the moving target in the preset size is always located at the preset position on the display screen of the control terminal.

Optionally, the adjustment module is further configured to:

determine whether a speed change rate of the moving target in the moving direction of the unmanned aerial vehicle is greater than a first threshold; and if yes, adjust a speed of the unmanned aerial vehicle, so that the moving target in the preset size is always located at the preset position on the display screen.

Optionally, the adjustment module is further configured to:
  determine whether a difference between a speed of the moving target and a speed of the unmanned aerial vehicle is greater than a second threshold; and
  if yes, adjust a focal length of the camera, so that the moving target in the preset size is always located at the preset position on the display screen.

Optionally, the preset position is a central position of the display screen of the control terminal.

Optionally, the identification module is further configured to:
  determine whether the moving target is lost; and
  if yes, search for the moving target and re-identify and lock the moving target.

According to still another aspect of the embodiments of the disclosure, an unmanned aerial vehicle is provided, including:
  a body;
  arms, connected to the body;
  a power apparatus, disposed on the arm and configured to provide power for the unmanned aerial vehicle to fly;
  a photographing device, disposed on the body, where the photographing device includes a gimbal and a camera mounted on the gimbal;
  a vision chip, where the vision chip is disposed in the body and is configured to identify and lock a moving target; and
  a flight controller, where the flight controller is disposed on the body and is communicably connected to the vision chip and the flight controller is configured to:
  adjust a moving state of the unmanned aerial vehicle and/or parameters of the photographing device according to a moving state of the moving target, so that the moving target is always located on a display screen of a control terminal, where the control terminal is communicably connected to the unmanned aerial vehicle.

Optionally, the vision chip identifies and locks the moving target through machine vision.

Optionally, the vision chip is further configured to:
  acquire a plurality of images of the moving target through the photographing device;
  extract features of the moving target based on the plurality of images of the moving target, where the features of the moving target include at least one of a texture feature, a shape feature, or a spatial feature;
  establish a feature classification model, where the feature classification model is configured to represent a category of the moving target; and
  perform feature matching on the moving target based on the feature classification model, to identify and lock the moving target.

Optionally, the vision chip is further configured to:
  perform preprocessing on the plurality of images of the moving target.

Optionally, the vision chip is further configured to:
  performing preprocessing on performance features of each of the plurality of images of the moving target, so that the performance features of each of the images are consistent, where the performance features include at least one of the following:
  a color of the image, brightness of the image, or a size of the image.

Optionally, the moving state of the moving target includes a moving direction of the moving target, the parameters of the photographing device include an angle of the gimbal and then:

the flight controller is configured to:
  determine whether the moving direction of the moving target is consistent with a moving direction of the unmanned aerial vehicle; and
  if not, adjust the angle of the gimbal according to the moving direction of the moving target, so that the moving target is always located at a preset position on the display screen of the control terminal.

Optionally, the flight controller is further configured to:
  adjust a yaw angle of the gimbal when the moving direction of the moving target is leftward and rightward relative to the camera, so that the moving target is always located at the preset position on the display screen of the control terminal.

Optionally, the flight controller is further configured to:
  adjust a pitch angle of the gimbal when the moving direction of the moving target is forward and backward relative to the camera, so that the moving target is always located at the preset position on the display screen of the control terminal.

Optionally, the flight controller is further configured to:
  determine whether an image size of the moving target on the display screen of the control terminal is smaller than a preset size; and
  if yes, adjust the moving state of the unmanned aerial vehicle and/or the parameters of the photographing device, so that the moving target in the preset size is always located at the preset position on the display screen of the control terminal.

Optionally, the flight controller is further configured to:
  determine whether a speed change rate of the moving target in the moving direction of the unmanned aerial vehicle is greater than a first threshold; and
  if yes, adjust a speed of the unmanned aerial vehicle, so that the moving target in the preset size is always located at the preset position on the display screen.

Optionally, the flight controller is further configured to:
  determine whether a difference between a speed of the moving target and a speed of the unmanned aerial vehicle is greater than a second threshold; and
  if yes, adjust a focal length of the camera, so that the moving target in the preset size is always located at the preset position on the display screen.

Optionally, the preset position is a central position of the display screen of the control terminal.

Optionally, the vision chip is further configured to:
  determine whether the moving target is lost; and
  if yes, search for the moving target and re-identify and lock the moving target.

In the embodiments of the disclosure, first, a moving target to be tracked is identified and locked and then a moving state of an unmanned aerial vehicle and/or parameters of a photographing device are adjusted according to a moving state of the moving target, so that the moving target is controlled to be located on a display screen of a control terminal in a process of tracking the moving target. A method and an apparatus for tracking a moving target and an unmanned aerial vehicle provided in the disclosure can adjust the moving state of the unmanned aerial vehicle and/or the parameters of the photographing device in real time according to the moving state of the moving target and can ensure that the moving target in a preset size is always located on the display screen of the control terminal. Therefore, the embodiments improve the stability and reliability of the process of tracking the moving target and have a wider range of application.

BRIEF DESCRIPTION OF THE DRAWINGS

One or more embodiments are exemplarily described with reference to the corresponding figures in the accompanying drawings and the descriptions are not to be construed as limiting the embodiments. Components in the accompanying drawings that have same reference numerals are represented as similar components and unless otherwise particularly stated, the figures in the accompanying drawings are not drawn to scale.

DETAILED DESCRIPTION

To make the objectives, technical solutions and advantages of the disclosure clearer and more comprehensible, the following further describes the disclosure in detail with reference to the accompanying drawings and embodiments. It should be understood that the embodiments herein are provided for describing the disclosure and not intended to limit the disclosure.

Figure 1:
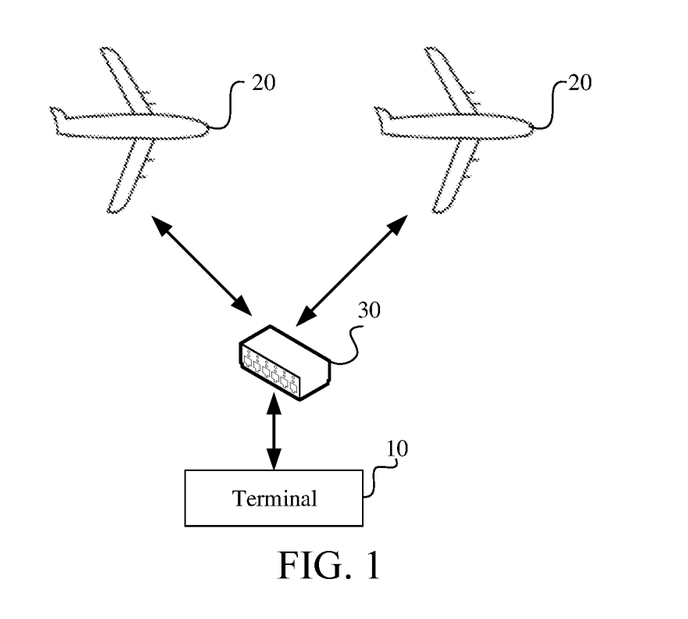
FIG. 1 is a schematic diagram of an operating environment of a method for tracking a moving target according to an embodiment of the disclosure.

Referring to FIG. 1, FIG. 1 is a schematic diagram of an operating environment of a method and an apparatus for tracking a moving target according to an embodiment of the disclosure. The operating environment includes a control terminal 10, an unmanned aerial vehicle 20 and a ground station 30. The control terminal 10 communicates with the unmanned aerial vehicle 20 through the ground station 30. A user can operate the unmanned aerial vehicle 20 through the control terminal 10 to implement the method for tracking a moving target. In this embodiment, the method and the apparatus for tracking a moving target are applicable to the unmanned aerial vehicle 20. The user can send information about a moving target or a tracking instruction from the ground station 30 to the unmanned aerial vehicle 20 by operating the control terminal 10 and the unmanned aerial vehicle 20 performs the method for tracking a moving target according to the information about the moving target or the tracking instruction. For example, after the unmanned aerial vehicle 20 receives the tracking instruction of the moving target sent by the control terminal 10, the unmanned aerial vehicle 20 is configured to identify and lock the moving target and adjust a moving state of the unmanned aerial vehicle 20 and/or parameters of a photographing device according to a moving state of the moving target, so that the moving target is always located on a display screen of the control terminal 10.

The following describes the method for tracking a moving target performed by the unmanned aerial vehicle 20 in conjunction with specific embodiments.

Figure 2:
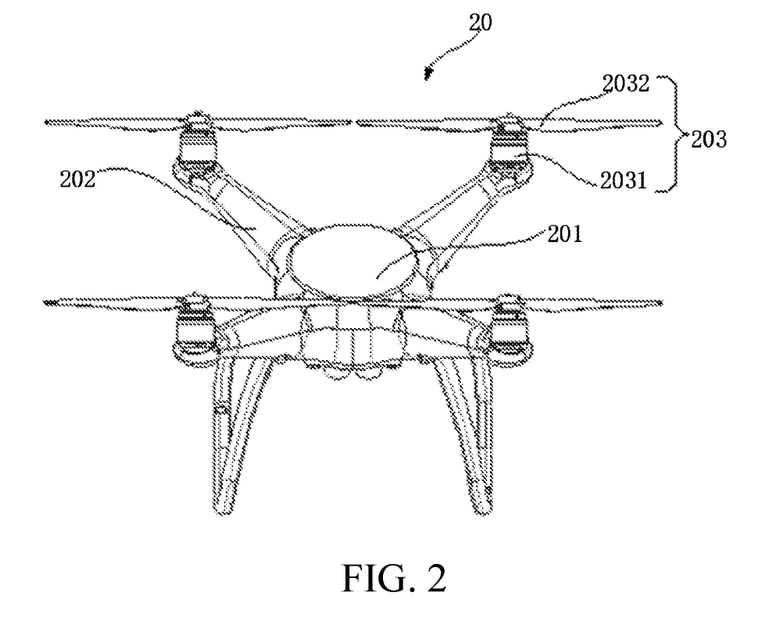
FIG. 2 is a schematic structural diagram of an unmanned aerial vehicle according to an embodiment of the disclosure.

Referring to FIG. 2, the unmanned aerial vehicle 20 includes: a body 201, four arms 202 extending from the body 201, a power apparatus 203 mounted on each arm 202, a photographing device (not shown) mounted on the body 201, a vision chip (not shown) mounted on the body 201 and a flight controller (not shown) mounted on the body 201. The photographing device is connected to each of the vision chip and the flight controller and the vision chip is connected to the flight controller.

The body 201 is fixedly connected to the arm 202. Preferably, the body 201 and the arm 202 are integrally formed. In another possible embodiment, the arm 202 can be further connected to the body 201 in a manner of being expanded or folded relative to the body 201. For example, the arm 202 can be connected to the body 201 through a rotating shaft mechanism, so that the arm 202 can be expanded or folded relative to the body 201.

The power apparatus 203 is configured to provide power for the unmanned aerial vehicle 20 to fly. The unmanned aerial vehicle 20 shown in FIG. 2 is a four-rotor unmanned aerial vehicle. The quantity of the power apparatuses 203 is four. In another possible embodiment, the unmanned aerial vehicle 20 may be any other suitable type of unmanned aerial vehicle, such as a fixed-wing unmanned aerial vehicle. When the power apparatus 203 is applicable to other types of unmanned aerial vehicles, the quantity of the power apparatuses 203 can be changed as required, which is not limited in the disclosure.

In another possible embodiment, the power apparatus 203 includes a driving apparatus 2031 and a propeller assembly 2032 driven by the driving apparatus 2031, where the propeller assembly 2032 is mounted on an output shaft of the driving apparatus 2031 and the propeller assembly 2032 is driven by the driving apparatus 2031 to rotate to generate lift or thrust for the unmanned aerial vehicle 20 to fly. The driving apparatus 2031 can be any suitable type of motor such as a brush motor, a brushless motor, a direct-current motor, a stepper motor, or an alternating-current induction motor.

The photographing device includes a gimbal (not shown) and a camera (not shown) mounted on the gimbal. The gimbal is mounted at the bottom of the body 201. The gimbal is configured to carry a high-definition digital camera or another photographing apparatus to eliminate disturbance to which the high-definition digital camera or the another photographing apparatus is subject, thereby ensuring the clarity and stability of a video shot by the camera or the another photographing apparatus.

The photographing device is configured to shoot a moving target to be tracked. The moving target includes, but is not limited to, people, animals, aircraft and other movable objects. A moving target shot by the photographing device may be a video or a picture including the moving target and the quantity of videos or pictures is not limited.

The vision chip is connected to the photographing device and the flight controller. The vision chip is configured to identify and lock the moving target. The vision chip can identify and lock the moving target through machine vision. Identifying the moving target through machine vision belongs to active identification and does not rely on other external sensors and therefore has high stability, a wide range of application and is not affected by a type of a moving target, improving the accuracy and reliability of target identification. In an embodiment of the disclosure, the vision chip acquires a plurality of images including the moving target from the photographing device, where the plurality of images may be images including the moving target shot by the photographing device from different photographing angles. Next, features of the moving target are extracted based on the plurality of images of the moving target, where the features of the moving target include at least one of a texture feature, a shape feature, or a spatial feature, where the texture feature is a feature of a surface of the moving target, which depicts recurring local patterns in an image of the moving target and an arrangement rule of the local patterns; and the shape feature refers to a shape of the moving target reflected in an image, such as a circle or a star. Then, a feature classification model is established, where the feature classification model is configured to represent a category of the moving target. In an embodiment of the disclosure, a classification algorithm in machine learning can be adopted to establish the feature classification model, where the classification algorithm includes a support vector machine, a neural network, a Bayesian classification algorithm, or the like. A main process of establishing the feature classification model includes collecting a large amount of sample data, extracting features of the sample data and inputting the extracted features into a classification trainer for training to determine a classifier and the classifier is the feature classification model. The sample data is a model library related to the moving target to be identified. Finally, feature matching is performed on the moving target based on the feature classification model, to identify and lock the moving target. In this embodiment, an image of the moving target and the model library corresponding to the moving target can be inputted into the established feature classification model and feature matching can be performed on the moving target, so as to identify and lock the moving target. After the feature matching, information about the moving target can be outputted, where the information about the moving target includes a name, a posture, a position, a shape, a category, a color, etc. of the moving target.

In another possible embodiment, the vision chip is further configured to perform preprocessing on the plurality of images of the moving target. Specifically, the vision chip is configured to perform preprocessing on performance features of each of the plurality of images of the moving target, so that the performance features of each of the images are consistent, where the performance features include at least one of the following: a color of the image, brightness of the image, or a size of the image. A process of preprocessing on images of the moving target by the vision chip may be specifically performed after the vision chip acquires a plurality of images including the moving target from the photographing device, that is, preprocessing is performed on a plurality of images including the moving target. By performing preprocessing on the images of the moving target, the identification accuracy of the moving target can be improved.

As described above, after the vision chip identifies and locks the moving target, the flight controller tracks the moving target according to the moving target locked by the vision chip and an identification result of the moving target. In an embodiment of the disclosure, the flight controller adjusts a moving state of the unmanned aerial vehicle 20 and/or parameters of the photographing device according to the moving state of the moving target, so that the moving target is always located on a display screen of the control terminal 10.

In an embodiment of the disclosure, the moving state of the moving target includes a moving direction of the moving target, the moving state of the unmanned aerial vehicle 20 includes a moving direction of the unmanned aerial vehicle 20 and the parameters of the photographing device include an angle of the gimbal. The flight controller determines whether the moving direction of the moving target is consistent with the moving direction of the unmanned aerial vehicle 20; and if not, adjusts the angle of the gimbal according to the moving direction of the moving target, so that the moving target is always located at a preset position on the display screen of the control terminal.

In an embodiment of the disclosure, when determining whether the moving direction of the moving target is consistent with the moving direction of the unmanned aerial vehicle 20, the flight controller can compare the acquired moving direction of the moving target with the moving direction of the unmanned aerial vehicle 20. When parameters corresponding to the two moving directions are completely the same or errors of the parameters fall within a preset range, it is determined that the moving direction of the moving target is consistent with the moving direction of the unmanned aerial vehicle 20; otherwise, the moving directions of the two are inconsistent.

In an embodiment of the disclosure, a yaw angle of the gimbal is adjusted when the moving direction of the moving target is leftward and rightward relative to the camera. A pitch angle of the gimbal is adjusted when the moving direction of the moving target is forward and backward relative to the camera. Thus, the moving target is always located at the preset position on the display screen of the control terminal.

In an embodiment of the disclosure, the control terminal 10 includes a display module and an image corresponding to the moving target is displayed through the display module. The control terminal 10 may be specifically a smartphone, a notebook computer, a tablet computer, a smart bracelet, or the like.

In an embodiment of the disclosure, the preset position is a central position of the display screen of the control terminal 10. In another possible embodiment, the preset position may alternatively be a position other than the central position.

In another possible embodiment, when an image size of the moving target on the display screen of the control terminal 10 is small, for example, when the image size is smaller than a preset size, to ensure the tracking effect and to track the moving target more stably, the flight controller adjusts the moving state of the unmanned aerial vehicle 20 and/or the parameters of the photographing device in time, so that the moving target in the preset size is always located at the preset position on the display screen of the control terminal 10.

The preset size can be set by the flight controller according to a size of the display screen of the control terminal, or can be customized by a user according to personal preferences. The preset size includes height, width, volume and the like of the moving target.

In an embodiment of the disclosure, the moving state of the unmanned aerial vehicle 20 includes a speed of the unmanned aerial vehicle 20. When the image size of the moving target on the display screen of the control terminal 10 is smaller than the preset size, the flight controller determines whether a speed change rate of the moving target in the moving direction of the unmanned aerial vehicle 20 is greater than a first threshold; and if yes, adjusts the speed of the unmanned aerial vehicle 20, so that the moving target in the preset size is always located at the preset position on the display screen. The first threshold may be a speed change rate parameter set by the flight controller, or a speed change rate parameter defined by a user. By adjusting the speed of the unmanned aerial vehicle, it can be ensured that the moving target can always be maintained in an original screen size, which ensures the stability and reliability of tracking.

In an embodiment of the disclosure, parameters of the photographing device include a focal length of the camera. When the image size of the moving target on the display screen of the control terminal 10 is smaller than the preset size, the flight controller determines whether a difference between a speed of the moving target and a speed of the unmanned aerial vehicle 20 is greater than a second threshold; and if yes, adjusts a focal length of the camera, so that the moving target in the preset size is always located at the preset position on the display screen. The second threshold may be a speed parameter set by the flight controller, or a speed parameter defined by a user. The focal length of the camera of the unmanned aerial vehicle 20 is adjusted. According to a camera imaging principle, it can be learned that $1/U+1/V=1/F$, where U represents an object-to-lens distance, V represents an image-to-lens distance and F represents a focal length. When a distance between the moving target and a lens becomes larger and the focal length remains the same, a size of the moving target seen on the display screen of the control terminal 10 becomes smaller; when the distance between the moving target and the lens becomes larger and the focal length becomes smaller, the size of the moving target seen on the display screen of the control terminal 10 becomes smaller; and when the distance between the moving target and the lens becomes larger and the focal length becomes larger, the size of the moving target seen on the display screen of the control terminal 10 becomes larger. Therefore, when the distance between the moving target and the lens changes, the focal length of the camera of the unmanned aerial vehicle 20 can be adjusted according to a change of the size of the moving target on the display screen of the control terminal 10. In this way, the uniqueness of the size of the moving target on the display screen of the control terminal can be ensured by adjusting the focal length of the camera.

As described above, by respectively adjusting the angle of the gimbal, the speed of the unmanned aerial vehicle 20 and the focal length of the camera, it can be ensured that the moving target to be tracked can always be maintained within a preset tracking range and the uniqueness of the image size of the moving target on the display screen of the control terminal can be ensured. It is worth noting that the three adjustment manners can be independent or progressive. For example, a first level of adjustment is performed by adjusting the angle of the gimbal, so that the moving target is always kept on the display screen of the control terminal. In a process of adjusting the angle of the gimbal, if it is found that a distance between the moving target and the unmanned aerial vehicle is too small or too large, a second level of adjustment is performed by adjusting the speed of the unmanned aerial vehicle 20 to ensure that the image size of the moving target on the display screen of the control terminal is basically the same. In this case, if there is still no way to ensure that the image size of the moving target on the display screen of the control terminal is kept stable, a third level of adjustment is performed by adjusting the focal length of the camera, thereby ensuring the stability and reliability of tracking to the greatest extent.

It may be understood that, in a process of tracking the moving target in the above manner, there may still be a situation in which the moving target to be tracked is lost. Therefore, in another possible embodiment, the vision chip is further configured to determine whether the moving target is lost; and if yes, search for the moving target and re-identify and lock the moving target. In an embodiment of the disclosure, the vision chip can determine whether the moving target is lost in the following manner: When the moving target cannot be identified in any image acquired by the photographing device within a preset time, the moving target is considered to be lost. Alternatively, when a size of the moving target acquired from the display screen of the control terminal is less than a preset threshold, for example, a mobile terminal becomes very small on the display screen of the control terminal, or even can only be represented by one dot, the moving target is considered to be lost. Alternatively, whether the moving target is lost is determined by other means.

After the moving target is lost, the flight controller may search for the moving target according to a historical moving trajectory of the moving target, or search for the moving target by adopting other methods.

After the moving target is lost, the flight controller may further send warning information to the control terminal 10 to remind a user to pay attention. In addition, a process in which the flight controller re-identifies and searches for the moving target may be displayed on the display screen of the control terminal 10.

The unmanned aerial vehicle provided in the embodiments of the disclosure acquires image information of a moving target through a photographing device and analyzes the image information of the moving target through a vision chip, thereby identifying and locking the moving target. Then, a flight controller tracks the identified and locked moving target. In a process of tracking the moving target, the flight controller can adjust a moving state of the unmanned aerial vehicle and/or parameters of the photographing device, so that the moving target can always, in a preset size, be displayed on a display screen of a control terminal and always be kept at a preset position on the display screen. The unmanned aerial vehicle can track the moving target more accurately, ensuring the stability and reliability of tracking to the greatest extent.

Figure 3:
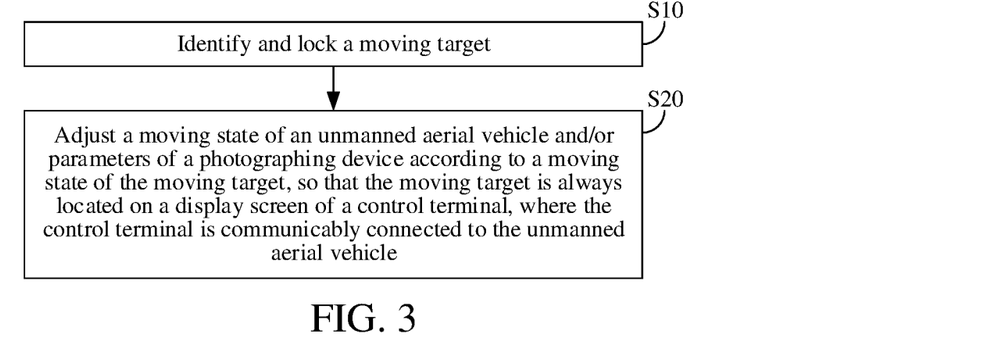
FIG. 3 is a flowchart of a method for tracking a moving target according to an embodiment of the disclosure.

A method and an apparatus for tracking a moving target applicable to the foregoing unmanned aerial vehicle 20 are provided below. Referring to FIG. 3, the method for tracking a moving target includes the following step.

S10. Identify and lock a moving target.

The identifying and locking a moving target includes: identifying and locking the moving target through machine vision. Specifically, referring to FIG. 4, in an embodiment of the disclosure, step S10 may include the following steps.

Figure 4:
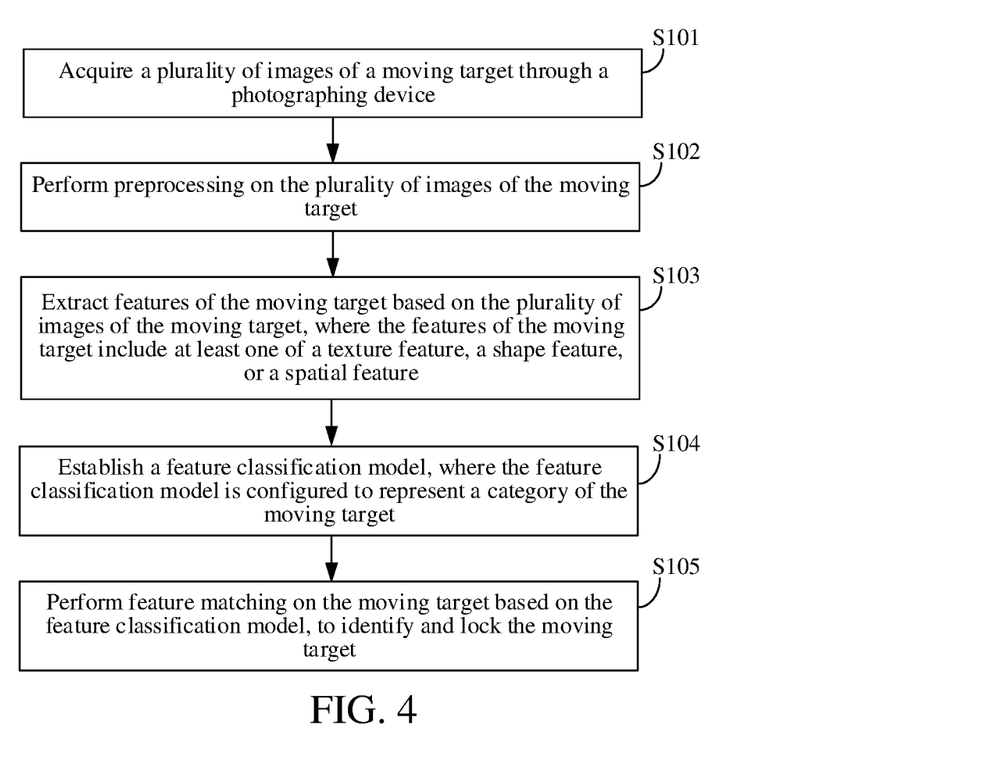
FIG. 4 is a flowchart of an embodiment in step S10 in a method for tracking a moving target according to an embodiment of the disclosure.

S101. Acquire a plurality of images of the moving target through the photographing device. The moving target can be shot from a plurality of angles by using the camera on the unmanned aerial vehicle to acquire images of the moving target at different angles and positions.

S102. Perform preprocessing on the plurality of images of the moving target.

The performing preprocessing on the plurality of images of the moving target includes:

performing preprocessing on performance features of each of the plurality of images of the moving target, so that the performance features of each of the images are consistent, where the performance features include at least one of a color of the image, brightness of the image, or a size of the image.

S103. Extract features of the moving target based on the plurality of images of the moving target, where the features of the moving target include at least one of a texture feature, a shape feature, or a spatial feature.

To effectively implement classification and identification, it is necessary to transform the acquired original image data to acquire features that can best reflect the essence of classification. These features include but are not limited to a color feature, a texture feature, a shape feature, a spatial feature and the like. Reference can be made to an existing image identification method for a specific process of performing feature extraction. In addition, when there are many types of extracted features or moving targets to be identified, feature selection can be further performed after feature extraction is performed, to find a feature that best matches a current application scenario.

S104. Establish a feature classification model, where the feature classification model is configured to represent a category of the moving target.

S105. Perform feature matching on the moving target based on the feature classification model, to identify and lock the moving target.

For the specific content about identification and locking of the moving target, reference can be made to the embodiment of the unmanned aerial vehicle provided in the disclosure.

The method for tracking a moving target further includes the following step.

S20. Adjust a moving state of the unmanned aerial vehicle and/or parameters of the photographing device according to a moving state of the moving target, so that the moving target is always located on a display screen of a control terminal, where the control terminal is communicably connected to the unmanned aerial vehicle.

Figure 5:
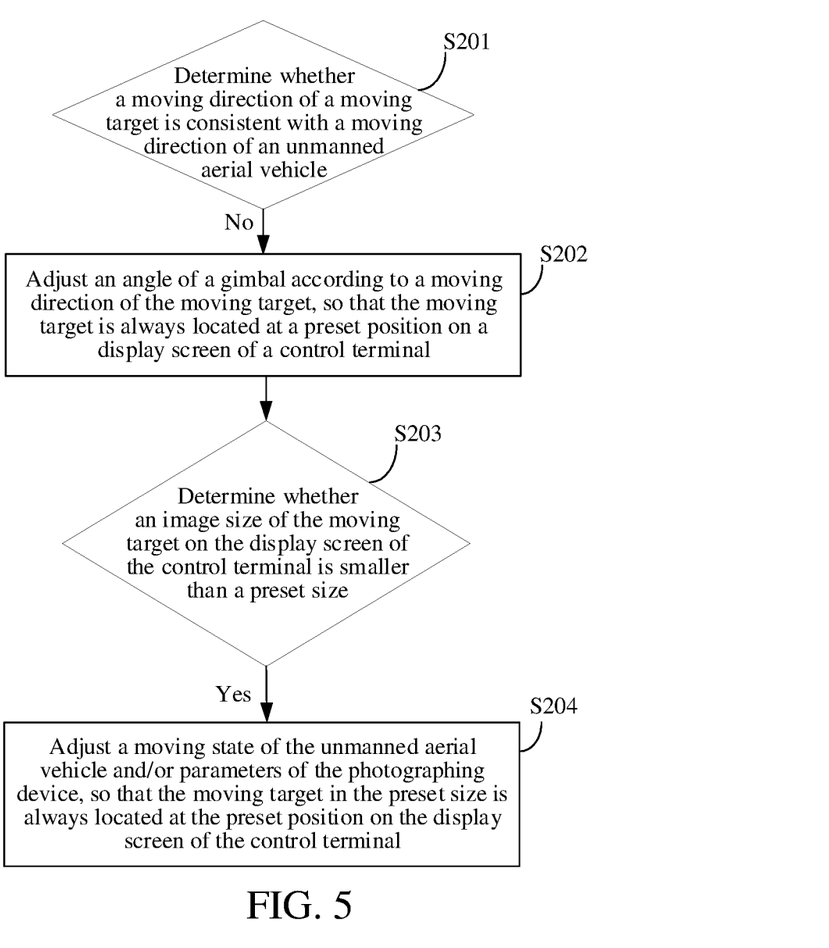
FIG. 5 is a flowchart of an embodiment in step S20 in a method for tracking a moving target according to an embodiment of the disclosure.

In an embodiment of the disclosure, the moving state of the moving target includes a moving direction of the moving target, the parameters of the photographing device include an angle of the gimbal and then, referring to FIG. 5, the above step S20 includes the following steps.

S201. Determine whether the moving direction of the moving target is consistent with a moving direction of the unmanned aerial vehicle.

If not, the following step S202 is performed.

S202. Adjust the angle of the gimbal according to the moving direction of the moving target, so that the moving target is always located at a preset position on the display screen of the control terminal.

In an embodiment of the disclosure, a yaw angle of the gimbal is adjusted when the moving direction of the moving target is leftward and rightward relative to the camera, so that the moving target is always located at the preset position on the display screen of the control terminal.

In an embodiment of the disclosure, a pitch angle of the gimbal is adjusted when the moving direction of the moving target is forward and backward relative to the camera, so that the moving target is always located at the preset position on the display screen of the control terminal.

In another possible embodiment, still referring to FIG. 5, the method further includes the following steps.

S203. Determine whether an image size of the moving target on the display screen of the control terminal is smaller than a preset size.

If yes, the following step S204 is performed.

S204. Adjust the moving state of the unmanned aerial vehicle and/or the parameters of the photographing device, so that the moving target in the preset size is always located at the preset position on the display screen of the control terminal.

In an embodiment of the disclosure, the moving state of the unmanned aerial vehicle includes a speed of the unmanned aerial vehicle. The parameters of the photographing device further include a focal length of the camera. The preset position is a central position of the display screen of the control terminal.

When the image size of the moving target on the display screen of the control terminal is smaller than the preset size, it indicates that the tracking effect is not good. In this case, it is necessary to determine whether a speed change rate of the moving target in the moving direction of the unmanned aerial vehicle is greater than a first threshold; and if yes, the speed of the unmanned aerial vehicle is adjusted, so that the moving target in the preset size is always located at the preset position on the display screen.

In an embodiment of the disclosure, it can be further determined whether a difference between a speed of the moving target and a speed of the unmanned aerial vehicle is greater than a second threshold; and if yes, the focal length of the camera is adjusted, so that the moving target in the preset size is always located at the preset position on the display screen.

Figure 6:
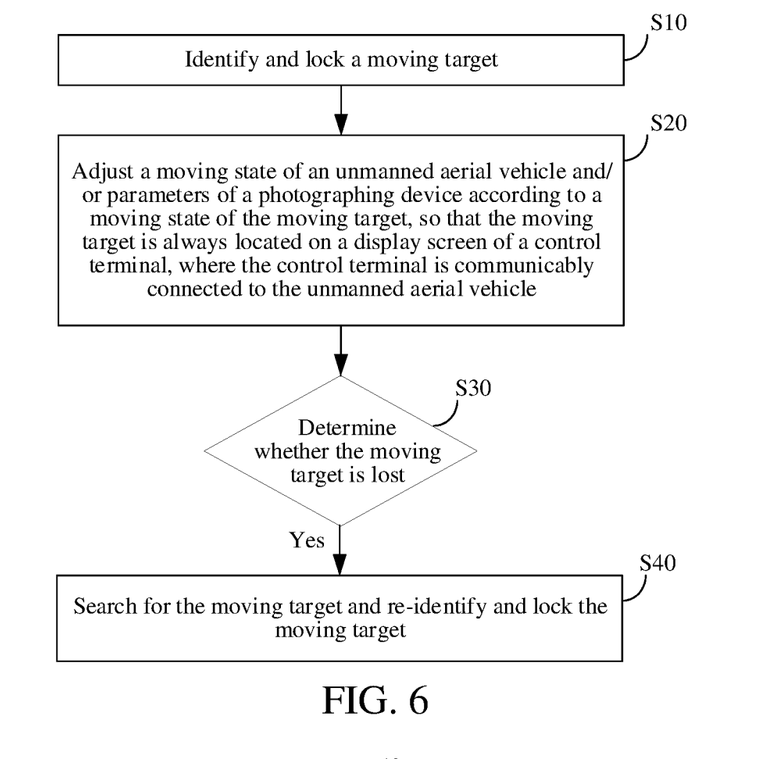
FIG. 6 is a flowchart of another embodiment of a method for tracking a moving target according to the disclosure.

In another possible embodiment, referring to FIG. 6, the method further includes the following steps.

S30. Determine whether the moving target is lost.

If yes, the following step S40 is performed.

S40. Search for the moving target and re-identify and lock the moving target.

For the detailed content of the method for tracking a moving target of the disclosure, reference may be made to the embodiment of the unmanned aerial vehicle provided in the disclosure and details are not described herein again.

In the method for tracking a moving target provided in the embodiments of the disclosure, first, a moving target to be tracked is identified and locked and then a moving state of an unmanned aerial vehicle and/or parameters of a photographing device are adjusted according to a moving state of the moving target, so that the moving target is controlled to be located on a display screen of a control terminal in a process of tracking the moving target. A method and an apparatus for tracking a moving target and an unmanned aerial vehicle provided in the disclosure can adjust the moving state of the unmanned aerial vehicle and/or the parameters of the photographing device in real time according to the moving state of the moving target and can ensure that the moving target in a preset size is always located on the display screen of the control terminal. Therefore, the embodiments improve the stability and reliability of the process of tracking the moving target and have a wider range of application.

Figure 7:
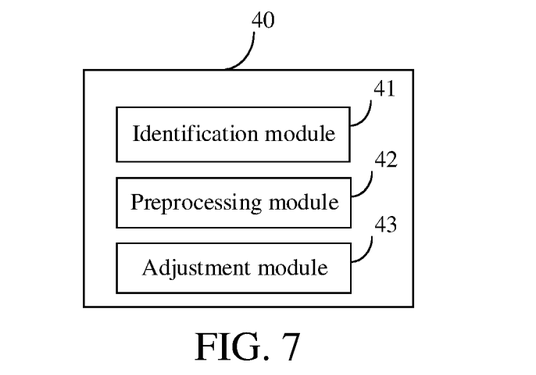
FIG. 7 is a structural block diagram of an apparatus for tracking a moving target according to an embodiment of the disclosure.

Referring to FIG. 7, FIG. 7 is a schematic structural diagram of an apparatus for tracking a moving target according to an embodiment of the disclosure. The apparatus for tracking a moving target is applicable to an unmanned aerial vehicle, where the unmanned aerial vehicle includes a photographing device, the photographing device includes a gimbal and a camera mounted on the gimbal and the apparatus 40 includes: an identification module 41, a pre-processing module 42 and an adjustment module 43.

The identification module 41 is configured to identify and lock a moving target. The identification module 41 identifies and locks the moving target through machine vision. Specifically, the identification module 41 is configured to: acquire images of the moving target from a plurality of angles through the photographing device to acquire a plurality of images of the moving target; extract features of the moving target based on the plurality of images of the moving target, where the features of the moving target include at least one of a texture feature, a shape feature, or a spatial feature; establish a feature classification model, where the feature classification model is configured to represent a category of the moving target; and perform feature matching on the moving target based on the feature classification model, to identify and lock the moving target.

The preprocessing module 42 is configured to perform preprocessing on the plurality of images of the moving target. The preprocessing module 42 is connected to the identification module 41 and the preprocessing module 42 acquires the plurality of images of the moving targets from the identification module 41. The preprocessing module 42 is further configured to:

perform preprocessing on performance features of each of the plurality of images of the moving target, so that the performance features of each of the images are consistent, where the performance features include at least one of the following: a color of the image, brightness of the image, or a size of the image.

The moving state of the moving target includes a moving direction of the moving target, the parameters of the photographing device include an angle of the gimbal and then, the adjustment module 43 is further configured to: determine whether the moving direction of the moving target is consistent with a moving direction of the unmanned aerial vehicle; and if not, adjust the angle of the gimbal according to the moving direction of the moving target, so that the moving target is always located at a preset position on the display screen of the control terminal.

The adjustment module 43 is further configured to: adjust a yaw angle of the gimbal when the moving direction of the moving target is leftward and rightward relative to the camera, so that the moving target is always located at the preset position on the display screen of the control terminal.

The adjustment module 43 is further configured to: adjust a pitch angle of the gimbal when the moving direction of the moving target is forward and backward relative to the camera, so that the moving target is always located at the preset position on the display screen of the control terminal.

The adjustment module 43 is further configured to: determine whether an image size of the moving target on the display screen of the control terminal is smaller than a preset size; and if yes, adjust the moving state of the unmanned aerial vehicle and/or the parameters of the photographing device, so that the moving target in the preset size is always located at the preset position on the display screen of the control terminal.

The adjustment module 43 is further configured to: determine whether a speed change rate of the moving target in the moving direction of the unmanned aerial vehicle is greater than a first threshold; and if yes, adjust a speed of the unmanned aerial vehicle, so that the moving target in the preset size is always located at the preset position on the display screen.

The adjustment module 43 is further configured to: determine whether a difference between a speed of the moving target and a speed of the unmanned aerial vehicle is greater than a second threshold; and if yes, adjust a focal length of the camera, so that the moving target in the preset size is always located at the preset position on the display screen.

The preset position is a central position of the display screen of the control terminal.

In another possible embodiment, the identification module 41 is further configured to: determine whether the moving target is lost; and if yes, search for the moving target and re-identify and lock the moving target.

It should be noted that content such as information exchange and an execution process between the modules and units in the device is based on a same idea as the method embodiments of the disclosure. Therefore, for detailed content, reference can be made to descriptions in the method embodiments of the disclosure and details are not described herein again.

In an embodiment of the disclosure, the identification module 41 and the preprocessing module 42 are a vision chip of the unmanned aerial vehicle and the adjustment module 43 is a flight controller of the unmanned aerial vehicle.

In the apparatus for tracking a moving target provided in the embodiments of the disclosure, first, a moving target to be tracked is identified and locked and then a moving state of an unmanned aerial vehicle and/or parameters of a photographing device are adjusted according to a moving state of the moving target, so that the moving target is controlled to be located on a display screen of a control terminal in a process of tracking the moving target. A method and an apparatus for tracking a moving target and an unmanned aerial vehicle provided in the disclosure can adjust the moving state of the unmanned aerial vehicle and/or the parameters of the photographing device in real time according to the moving state of the moving target and can ensure that the moving target in a preset size is always located on the display screen of the control terminal. Therefore, the embodiments improve the stability and reliability of the process of tracking the moving target and have a wider range of application.

The foregoing described device embodiments are merely examples. The units described as separate parts may or may not be physically separate and the parts displayed as units may or may not be physical units, may be located in one position, or may be distributed on a plurality of network units. Some or all of the modules may be selected according to actual needs to achieve the objectives of the solutions of the embodiments.

Based on the descriptions of the foregoing implementations, a person of ordinary skill in the art may clearly understand that the implementations may be implemented by software in addition to a universal hardware platform, or by hardware. A person of ordinary skill in the art may understand that, all or some of the processes of the method in the foregoing embodiments may be implemented by a computer program instructing relevant hardware. The program may be stored in a computer-readable storage medium. During execution of the program, the processes of the foregoing method embodiments may be included. The foregoing storage medium may include a magnetic disc, an optical disc, a read-only memory (ROM), a random access memory (RAM), or the like.

Finally, it should be noted that the foregoing embodiments are merely used to describe the technical solutions of the disclosure, but are not intended to limit the disclosure. Under the concept of the disclosure, the technical features in the foregoing embodiments or different embodiments may be combined, the steps may be implemented in any sequence and there may be many other changes in different aspects of the disclosure. For brevity, those are not provided in detail. Although the disclosure is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of the disclosure.

What is claimed is:

1. A method for tracking a moving target, performed by an unmanned aerial vehicle, wherein the unmanned aerial vehicle comprises a photographing device and the photographing device comprises a gimbal and a camera mounted on the gimbal, wherein the method comprises:
   identifying and locking a moving target; and
   adjusting a moving state of the unmanned aerial vehicle and parameters of the photographing device according to a moving state of the moving target, so that the moving target is always located on a display screen of a control terminal, wherein the control terminal is communicably connected to the unmanned aerial vehicle;
   wherein the moving state of the moving target comprises a moving direction of the moving target, the parameters of the photographing device comprise an angle of the gimbal and then;
   the adjusting a moving state of the unmanned aerial vehicle and parameters of the photographing device according to a moving state of the moving target, so that the moving target is always located on a display screen of a control terminal comprises:
   determining whether the moving direction of the moving target is consistent with a moving direction of the unmanned aerial vehicle; and
   adjusting the angle of the gimbal according to the moving direction of the moving target, when the moving direction of the moving target is inconsistent with the moving direction of the unmanned aerial vehicle, so that the moving target is always located at a preset position on the display screen of the control terminal;
   determining whether en image size of the moving target on the display screen of the control terminal is smaller than a preset size; and
   adjusting the moving state of the unmanned aerial vehicle and the parameters of the photographing device, when the image size of the moving target on the display screen of the control terminal is smaller than the preset size, so that the moving target in the preset size is always located at the preset position on the display screen of the control terminal;
   determining whether a speed change rate of the moving target in the moving direction of the unmanned aerial vehicle is greater than a first threshold; and
   adjusting a speed of the unmanned aerial vehicle, when the speed change rate of the moving target in the moving direction of the unmanned aerial vehicle is greater than the first threshold, so that the moving target in the preset size is always located at the preset position on the display screen.

2. The method according to claim 1, wherein the identifying and locking a moving target comprises:
   identifying and locking the moving target through machine vision.

3. The method according to claim 1, wherein the identifying and locking a moving target comprises:
   acquiring a plurality of images of the moving target through the photographing device;
   extracting features of the moving target based on the plurality of images of the moving target, wherein the features of the moving target comprise at least one of a texture feature, a shape feature, or a spatial feature;
   establishing a feature classification model, wherein the feature classification model is configured to represent a category of the moving target; and
   performing feature matching on the moving target based on the feature classification model, to identify and lock the moving target.

4. The method according to claim 3, wherein the method further comprises:
   performing preprocessing on the plurality of images of the moving target.

5. The method according to claim 4, wherein the performing preprocessing on the plurality of images of the moving target comprises:
   performing preprocessing on performance features of each of the plurality of images of the moving target, so that the performance features of each of the images are consistent, wherein the performance features comprise at least one of the following:
   a color of the image, brightness of the image, or a size of the image.

6. The method according to claim 1, wherein when the moving direction of the moving target is inconsistent with the moving direction of the unmanned aerial vehicle, the adjusting the angle of the gimbal according to the moving direction of the moving target, so that the moving target is always located at a preset position on the display screen of the control terminal comprises:
   adjusting a yaw angle of the gimbal when the moving direction of the moving target is leftward and rightward relative to the camera, so that the moving target is always located at the preset position on the display screen of the control terminal.

7. The method according to claim 1, wherein when the moving direction of the moving target is inconsistent with the moving direction of the unmanned aerial vehicle, the adjusting the angle of the gimbal according to the moving direction of the moving target, so that the moving target is always located at a preset position on the display screen of the control terminal comprises:
   adjusting a pitch angle of the gimbal when the moving direction of the moving target is forward and backward relative to the camera, so that the moving target is always located at the preset position on the display screen of the control terminal.

8. The method according to claim 1, wherein when the image size of the moving target on the display screen of the control terminal is smaller than the preset size, the adjusting the moving state of the unmanned aerial vehicle and the parameters of the photographing device, so that the moving target in the preset size is always located at the preset position on the display screen of the control terminal comprises:
   determining whether a difference between a speed of the moving target and a speed of the unmanned aerial vehicle is greater than a second threshold; and
   adjusting a focal length of the camera, when the speed change rate of the moving target in the moving direction of the unmanned aerial vehicle is greater than the second threshold, so that the moving target in the preset size is always located at the preset position on the display screen.

9. The method according to claim 1, wherein the preset position is a central position of the display screen of the control terminal.

10. The method according to claim 1, wherein the method further comprises:
    determining whether the moving target is lost; and
    searching for the moving target and re-identifying and locking the moving target when the moving target is lost.

11. An unmanned aerial vehicle, comprising:
a body;
arms, connected to the body;
a power apparatus, disposed on the arm and configured to provide power for the unmanned aerial vehicle to fly;
a photographing device, disposed on the body, wherein the photographing device comprises a gimbal and a camera mounted on the gimbal;
a vision chip, wherein the vision chip is disposed in the body and is configured to identify and lock a moving target; and
a flight controller, wherein the flight controller is disposed on the body and is communicably connected to the vision chip and the flight controller is configured to:
adjust a moving state of the unmanned aerial vehicle and parameters of the photographing device according to a moving state of the moving target, so that the moving target is always located on a display screen of a control terminal, wherein the control terminal is communicably connected to the unmanned aerial vehicle;
wherein the moving state of the moving target comprises a moving direction of the moving target, the parameters of the photographing device comprise an angle of the gimbal and then;
the flight, controller is configured to:
determine whether the moving direction of the moving target is consistent with a moving direction of the unmanned aerial vehicle; and
adjust the angle of the gimbal according to the moving direction of the moving target, when the moving direction of the moving target is inconsistent with the moving direction of the unmanned aerial vehicle, so that the moving target is always located at a preset position on the display screen of the control terminal;
determine whether an image size, of the moving, target on the display screen of the control terminal is smaller than a preset size; and
adjust the moving state of the unmanned aerial vehicle and the parameters of the photographing device, when the image size of the moving target on the display screen of the control terminal is smaller than the preset size, so that the moving target in the preset size is always located et the preset position on the display screen of the control terminal;
determine whether a speed change rate of the moving target in the moving direction of the unmanned aerial vehicle is greater than a first threshold; and
adjust a speed of the unmanned aerial vehicle, when the speed change rate of the moving target in the moving direction of the unmanned aerial vehicle is greater than the first threshold, so that the moving target in the preset size is always located at the preset position on the display screen.

12. The unmanned aerial vehicle according to claim 11, wherein the vision chip identifies and locks the moving target through machine vision.

13. The unmanned aerial vehicle according to claim 11, wherein the vision chip is further configured to:

acquire a plurality of images of the moving target through the photographing device;
extract features of the moving target based on the plurality of images of the moving target, wherein the features of the moving target comprise at least one of a texture feature, a shape feature, or a spatial feature;
establish a feature classification model, wherein the feature classification model is configured to represent a category of the moving target; and
perform feature matching on the moving target based on the feature classification model, to identify and lock the moving target.

14. The unmanned aerial vehicle according to claim 13, wherein the vision chip is further configured to;
perform preprocessing on the plurality of images of the moving target.

15. The unmanned aerial vehicle according to claim 14, wherein the vision chip is further configured to:
performing preprocessing on performance features of each of the plurality of images of the moving target, so that the performance features of each of the images are consistent, wherein the performance features comprise at least one of the following:
a color of the image, brightness of the image, or a size of the image.

16. The unmanned aerial vehicle according to claim 11, wherein the flight controller is further configured to:
adjust a yaw angle of the gimbal when the moving direction of the moving target is leftward and rightward relative to the camera, so that the moving target is always located at the preset position on the display screen of the control terminal.

17. The unmanned aerial vehicle according to claim 11, wherein the flight controller is further configured to:
adjust a pitch angle of the gimbal when the moving direction of the moving target is forward and backward relative to the camera, so that the moving target is always located at the preset position on the display screen of the control terminal.

18. The unmanned aerial vehicle according to claim 11, wherein the flight controller is further configured to:
determine whether a difference between a speed of the moving target and a speed of the unmanned aerial vehicle is greater than a second threshold; and
adjust a focal length of the camera, when the speed change rate of the moving target in the moving direction of the unmanned aerial vehicle is greater than the second threshold, so that the moving target in the preset size is always located at the preset position on the display screen.

19. The unmanned aerial vehicle according to claim 11, wherein the preset position is a central position of the display screen of the control terminal.

20. The unmanned aerial vehicle according to claim 11, wherein the vision chip is further configured to:
determine whether the moving target is lost;
search for the moving target and re-identify and lock the moving target when the moving target is lost.

* * * * *